(12) United States Patent
Rosen

(10) Patent No.: US 6,292,236 B1
(45) Date of Patent: *Sep. 18, 2001

(54) AUTOMOTIVE-CEILING-MOUNTED MONITOR

(75) Inventor: John B. Rosen, Eugene, OR (US)

(73) Assignee: Rosen Products LLC, Eugene, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 09/409,307

(22) Filed: Oct. 8, 1999

Related U.S. Application Data

(63) Continuation-in-part of application No. 09/277,620, filed on Mar. 26, 1999, now Pat. No. 6,168,612.

(51) Int. Cl.[7] .................................................. H04H 5/64
(52) U.S. Cl. ............................................ 348/837; 224/311
(58) Field of Search ............................ 312/7.2, 236, 298; 348/836, 837; 295/37.8; 361/681, 726; 345/905; 455/395; 224/311; 248/923

(56) References Cited

U.S. PATENT DOCUMENTS

| | | |
|---|---|---|
| D. 285,684 | 9/1986 | Akita et al. . |
| D. 293,579 | 1/1988 | Davis . |
| D. 294,495 | 3/1988 | Nissley . |
| D. 299,491 | 1/1989 | Masuda . |
| D. 337,103 | 7/1993 | Harper . |
| D. 356,081 | 3/1995 | Naito et al. . |
| D. 366,067 | 1/1996 | Mowrey . |
| D. 395,458 | 6/1998 | Smith et al. . |
| 4,195,431 | 4/1980 | Neufeld . |
| 4,383,626 | 5/1983 | Weinblatt . |
| 4,438,458 | 3/1984 | Münscher . |
| 4,504,910 | 3/1985 | Araki et al. . |
| 4,516,157 | 5/1985 | Campbell . |
| 4,620,808 | 11/1986 | Kurtin et al. . |
| 4,630,821 | 12/1986 | Greenwald . |

(List continued on next page.)

FOREIGN PATENT DOCUMENTS

| | | |
|---|---|---|
| 3820510 | 12/1989 | (DE) . |
| 41 18 711 | 12/1992 | (DE) . |
| 131 988 | 1/1985 | (EP) . |
| 365 290 | 4/1990 | (EP) . |
| 2 544 675 | 4/1983 | (FR) . |

(List continued on next page.)

OTHER PUBLICATIONS

"TV for Cars", Soviero, *Popular Science*, pp. 88–89, Dec. 1990.

LCD Video System Product Specification Sheet, a company named Korea Electronics Co. Ltd. contends that it showed this sheet of paper to some people at the Nov. 5–8, 1996 Specialty Equipment Manufacturers Association (SEMA) trade show in Las Vegas, Nevada.

*Primary Examiner*—Peter M. Cuomo
*Assistant Examiner*—Gerald A. Anderson
(74) *Attorney, Agent, or Firm*—Kolisch, Hartwell, Dickinson, McCormack & Heuser

(57) ABSTRACT

A ceiling-mounted automotive display unit mounted in the ceiling of an automobile above the front passenger seat. The unit includes a screen with a viewing surface, the screen being mounted for movement between a stowed position wherein the screen is generally parallel to the plane of the ceiling and facing downward to reveal the viewing surface to a reclined front seat passenger, and a deployed position wherein the screen projects downward from the ceiling and faces rearward to reveal the viewing surface to a rear seat passenger.

5 Claims, 3 Drawing Sheets

U.S. PATENT DOCUMENTS

| | | |
|---|---|---|
| 4,633,323 | 12/1986 | Haberkern et al. . |
| 4,635,110 | 1/1987 | Weinblatt . |
| 4,647,980 | 3/1987 | Steventon et al. . |
| 4,665,430 | 5/1987 | Hiroyasu . |
| 4,708,312 | 11/1987 | Rohr . |
| 4,735,467 | 4/1988 | Wolters . |
| 4,742,478 | 5/1988 | Nigro, Jr. et al. . |
| 4,749,364 | 6/1988 | Arney et al. . |
| 4,787,040 | 11/1988 | Ames et al. . |
| 4,814,896 | 3/1989 | Heitzman et al. . |
| 4,824,159 | 4/1989 | Fluharty et al. . |
| 4,836,486 | 6/1989 | Vossoughi . |
| 4,843,477 | 6/1989 | Mizutani et al. . |
| 4,866,515 | 9/1989 | Tagawa et al. . |
| 4,867,498 | 9/1989 | Delphia et al. . |
| 4,870,676 | 9/1989 | Lewo . |
| 4,883,242 | 11/1989 | Becker et al. . |
| 4,910,591 | 3/1990 | Petrossian et al. . |
| 4,915,461 | 4/1990 | Kingsborough et al. . |
| 4,947,296 | 8/1990 | Takeuchi et al. . |
| 4,982,996 | 1/1991 | Vottero-Fin et al. . |
| 4,983,951 | 1/1991 | Igarashi et al. . |
| 4,988,140 | 1/1991 | Van Order . |
| 4,995,680 | 2/1991 | Miruri . |
| 5,009,384 | 4/1991 | Gerke et al. . |
| 5,021,922 | 6/1991 | Davis et al. . |
| 5,027,200 | 6/1991 | Petrossian et al. . |
| 5,034,996 | 7/1991 | Carey et al. . |
| 5,061,996 | 10/1991 | Schiffman . |
| 5,076,524 | 12/1991 | Reh et al. . |
| 5,096,271 | 3/1992 | Portman . |
| 5,096,287 | 3/1992 | Kakinami et al. . |
| 5,111,289 | 5/1992 | Lucas et al. . |
| 5,121,200 | 6/1992 | Choi . |
| 5,144,290 | 9/1992 | Honda et al. . |
| 5,145,128 | 9/1992 | Umeda . |
| 5,148,282 | 9/1992 | Sedighzadeh . |
| 5,161,028 | 11/1992 | Kawata et al. . |
| 5,173,686 | 12/1992 | Fujihara . |
| 5,177,616 | 1/1993 | Riday . |
| 5,179,447 | 1/1993 | Lain . |
| 5,195,709 | 3/1993 | Yasushi . |
| 5,222,690 | 6/1993 | Jeffords . |
| 5,233,426 | 8/1993 | Suzuki et al. . |
| 5,239,700 | 8/1993 | Guenther et al. . |
| 5,243,417 | 9/1993 | Pollard . |
| 5,281,985 | 1/1994 | Chan . |
| 5,287,191 | 2/1994 | Suzuki et al. . |
| 5,289,321 | 2/1994 | Secor . |
| 5,305,970 | 4/1994 | Porter et al. . |
| 5,311,302 | 5/1994 | Berry et al. . |
| 5,333,416 | 8/1994 | Harris et al. . |
| 5,335,076 | 8/1994 | Reh et al. . |
| 5,338,081 | 8/1994 | Young et al. . |
| 5,359,349 | 10/1994 | Jambor et al. . |
| 5,362,144 | 11/1994 | Shioya et al. . |
| 5,397,160 | 3/1995 | Landry . |
| 5,467,106 | 11/1995 | Salomon . |
| 5,469,298 | 11/1995 | Suman et al. . |
| 5,547,248 | 8/1996 | Marechal . |
| 5,574,443 | 11/1996 | Hsieh . |
| 5,583,735 | 12/1996 | Pease et al. . |
| 5,743,487 | 4/1998 | Rice . |
| 5,775,762 | 7/1998 | Vitito . |
| 5,822,023 | 10/1998 | Suman et al. . |
| 5,927,784 | 7/1999 | Vitito . |
| 5,946,055 | 8/1999 | Rosen . |

FOREIGN PATENT DOCUMENTS

| | | |
|---|---|---|
| 60-51087 | 3/1985 | (JP) . |
| 60-51088 | 3/1985 | (JP) . |
| 60-203526 | 10/1985 | (JP) . |
| 61-77542 | 4/1986 | (JP) . |
| 61-282139 | 12/1986 | (JP) . |
| 62-231847 | 10/1987 | (JP) . |
| 63-219440 | 9/1988 | (JP) . |
| 1-300775 | 12/1989 | (JP) . |
| 2-7082 | 1/1990 | (JP) . |
| 2-31577 | 2/1990 | (JP) . |
| 2-149083 | 6/1990 | (JP) . |
| 3-10476 | 1/1991 | (JP) . |
| 4-63739 | 2/1992 | (JP) . |
| 4-185547 | 7/1992 | (JP) . |
| 4-368245 | 12/1992 | (JP) . |
| 5-24486 | 2/1993 | (JP) . |
| 5-50883 | 3/1993 | (JP) . |
| 5-131879 | 5/1993 | (JP) . |
| 5-185878 | 7/1993 | (JP) . |
| 6-92187 | 4/1994 | (JP) . |
| 6-144009 | 5/1994 | (JP) . |

AUTOMOTIVE-CEILING-MOUNTED MONITOR

CROSS REFERENCE TO RELATED APPLICATION

This is a continuation-in-part of application Ser. No. 09/277,620 filed Mar. 26, 1999 now U.S. Pat. No, 6,168,612 for an AUTOMOTIVE DISPLAY UNIT. The subject matter of that application is incorporated herein by this reference.

TECHNICAL FIELD

The present invention relates generally to monitors, and more particularly, to a monitor mounted in an automobile such that it may be viewed selectively by front and/or rear seat passengers.

BACKGROUND ART

Automotive manufacturers have long sought to make passengers as comfortable as possible during travel, focusing both on physical comfort, and on advances in passenger entertainment. For example, the once-conventional AM radio has been replaced with the vehicle "sound system" as a standard accessory in most cars and trucks. More recently, efforts have involved attempts to bring video technology into the automobile, either in the form of a television, a computer, or a video game display.

Unfortunately, display units have heretofore been impractical as automotive accessories due to problems in mounting conventional display units within a vehicle. One problem relates to the size of such display units, it being difficult to find space for a standard-size monitor in most automobiles. Another problem arises from difficulties in placing the display unit in a position where it may be viewed by passengers, but will not obstruct the driver's view of the road. Still another problem involves the stowability of the display unit, and its corresponding effect on passenger safety.

Known display units also have been unable to meet consumer expectations due to difficulties in providing acceptable picture quality in a package of suitable size. However, with advancements in flat-panel display technology, picture quality of smaller display units has improved dramatically. Additionally, it has become possible to separate some of the electronic circuitry from the flat-panel display, further reducing the thickness of these displays.

Furthermore, although most modern automobiles are equipped to carry front and rear seat passengers, many owners operate their vehicles at less than capacity, often driving alone, or with a single front seat passenger. Although state and/or federal laws typically prohibit drivers from viewing TV, movies, or other video while driving, such laws usually do not extend to front seat passengers. Onboard monitors thus may be rendered ineffective where such monitors are configured to provide for viewing only by rear seat passengers. Accordingly, it would be useful to provide an automotive display unit configured to accommodate viewing thereof by front and/or rear seat passengers.

SUMMARY OF THE INVENTION

A ceiling-mounted automotive display unit is provided, such display unit being mounted on the ceiling of an automobile above the front passenger seat. The unit includes a screen with a viewing surface, the screen being mounted for movement between a stowed position wherein the screen is generally parallel to the plane of the ceiling and facing downward to reveal the viewing surface to a reclined front seat passenger, and a deployed position wherein the screen projects downward from the ceiling to reveal the viewing surface to a rear seat passenger. When the screen is deployed, the viewing surface typically is at an angle of between approximately 30-degrees and 60-degrees from horizontal, thereby promoting comfortable viewing of the screen by both front and rear seat passengers.

The screen typically is mounted on a housing for pivot about a first axis which is generally parallel to a predetermined edge of the screen. The screen pivots between a first orientation wherein the screen is at least partially contained within the housing (the stowed position), and a second orientation wherein the screen extends downwardly from the housing to present the screen's viewing surface to rear seat passengers (the deployed position). The screen also may be pivotal about a second axis, transverse to the first axis, so as to enhance adaptability and viewability of the screen.

In one embodiment, a cavity of predetermined shape and size is formed in the housing, the cavity being configured to contain the screen with its viewing surface generally flush with the housing and with the ceiling. This reduces the profile of the display unit when the unit is not in use, and eliminates any impediment to the driver's view. The profile may be reduced further by mounting the screen's control module separately from the screen, leaving a relatively thin pivotal screen. The housing further may include a retractable cover which covers the screen when the display unit is not in use.

These and other objects and advantages of the present invention will be more readily understood after a consideration of the drawings and the detailed description of the preferred embodiment which follows.

DETAILED DESCRIPTION OF PREFERRED EMBODIMENT AND BEST MODE OF CARRYING OUT THE INVENTION

Figure 4:
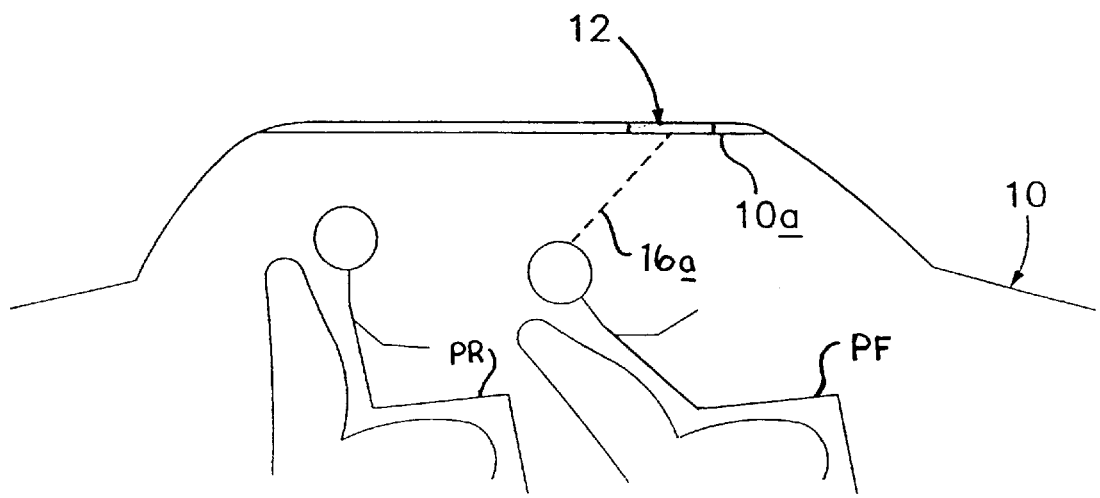
FIG. 4 is a somewhat simplified side view of an automotive interior, illustrating use of a display unit with the screen in the stowed position.
Figure 5:
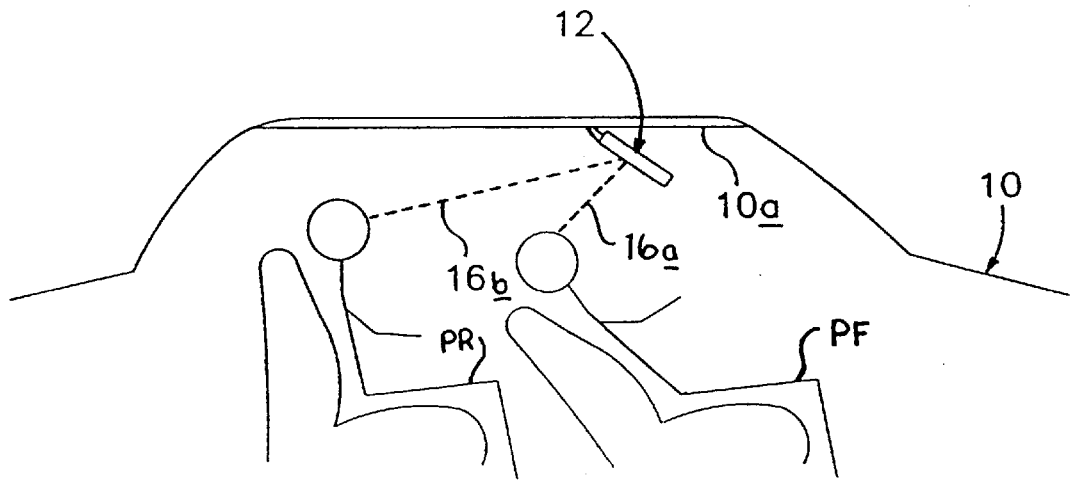
FIG. 5 is a view of an automotive interior similar to FIG. 4, but illustrating use of a display unit with the screen in a deployed position.
Figure 6:
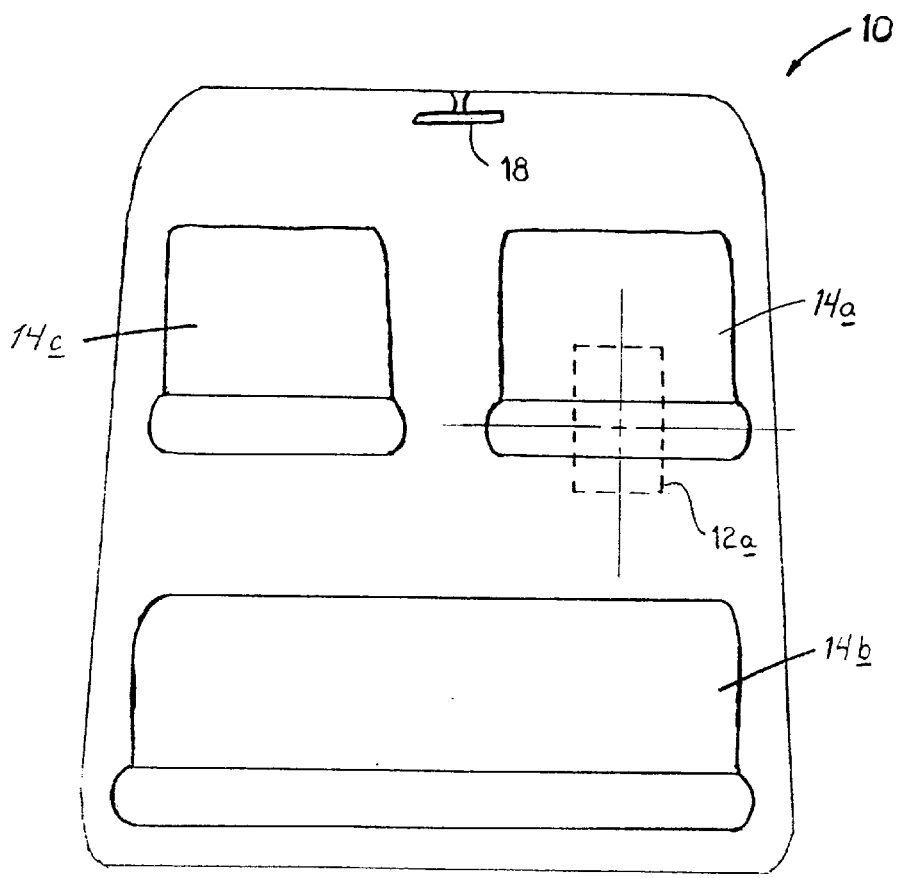
FIG. 6 is a simplified top plan view of an automobile interior, illustrating placement of the display unit relative to the front and rear passenger seats.

Referring to FIGS. 1 through 6, a display unit 12 is shown for use in an interior region of an automobile 10, the display unit being mounted to the automotive ceiling 10a. As indicated in FIGS. 4 through 6, the display unit is positioned over the seat back of the front passenger seat such that it may be viewed selectively by front seat passenger PF and/or by rear seat passenger(s) PR as will be described in detail below.

Figure 1:
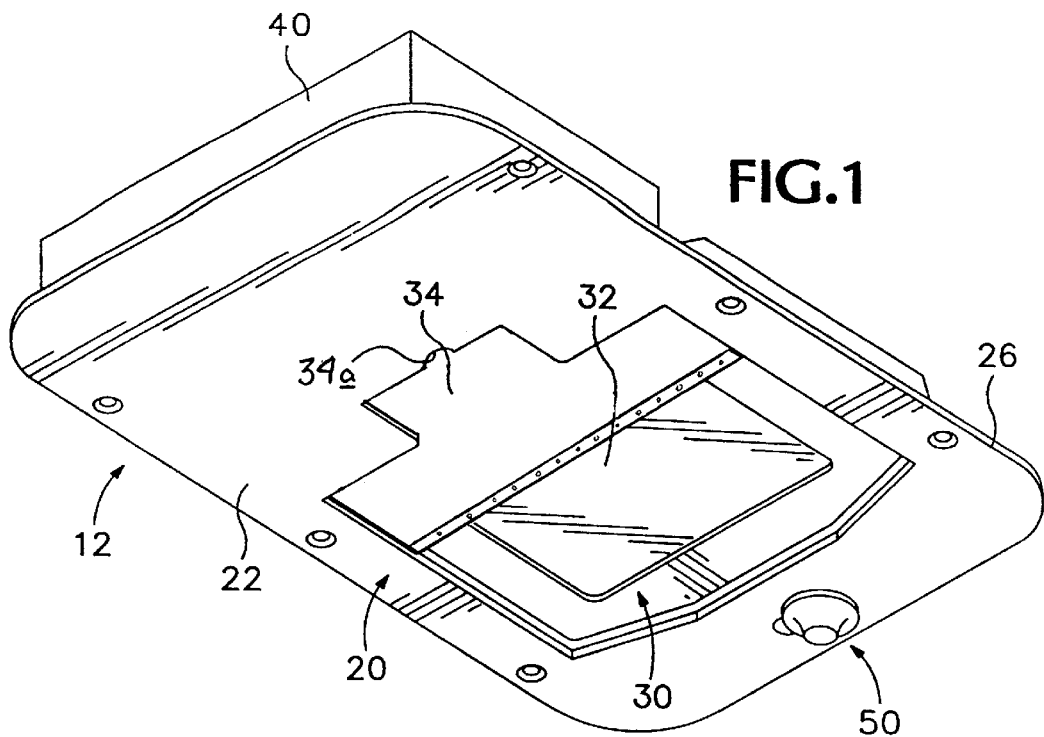
FIG. 1 is an isometric view of a display unit constructed in accordance with the present invention, the display unit including a screen shown in a stowed position with a partially retracted viewing surface cover.
Figure 2:
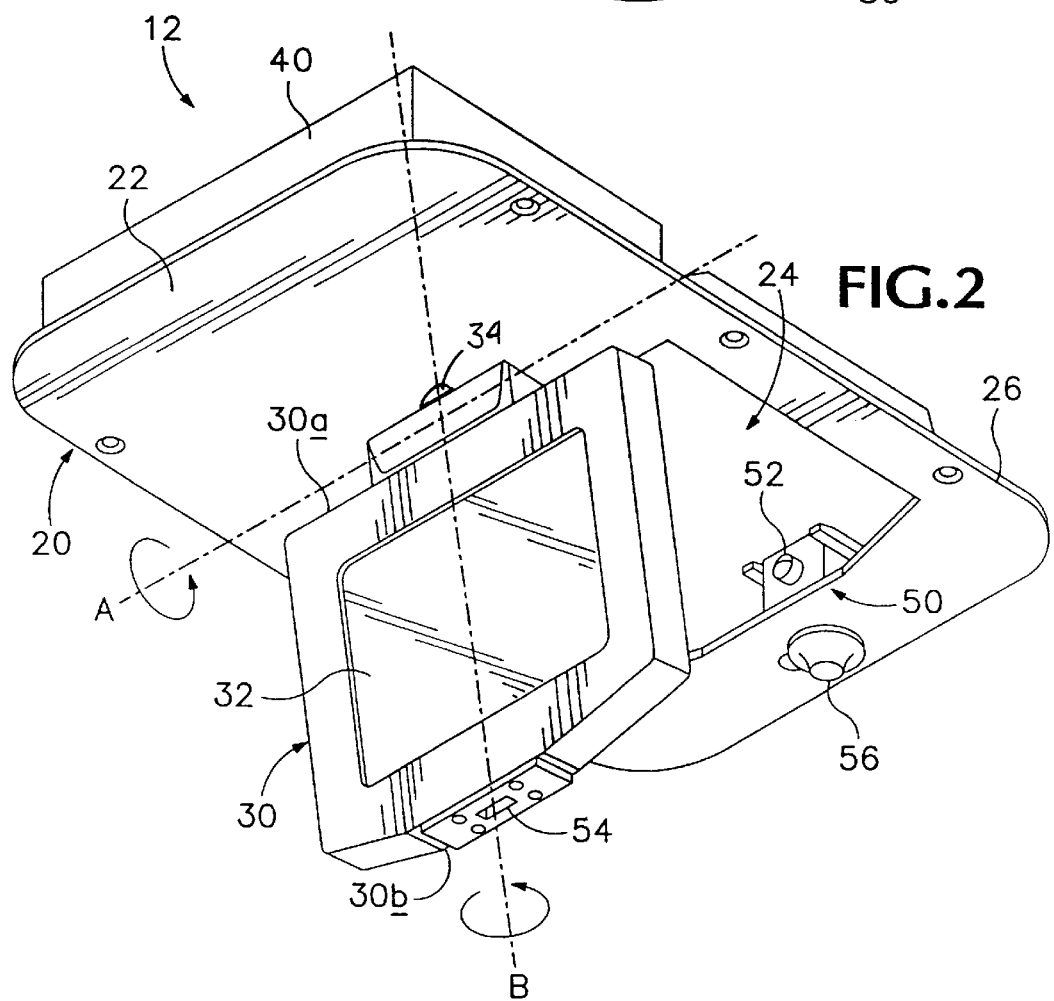
FIG. 2 is an isometric view similar to that of FIG. 1, but with viewing surface cover fully retracted, and with the screen pivoted to a deployed position.
Figure 3:
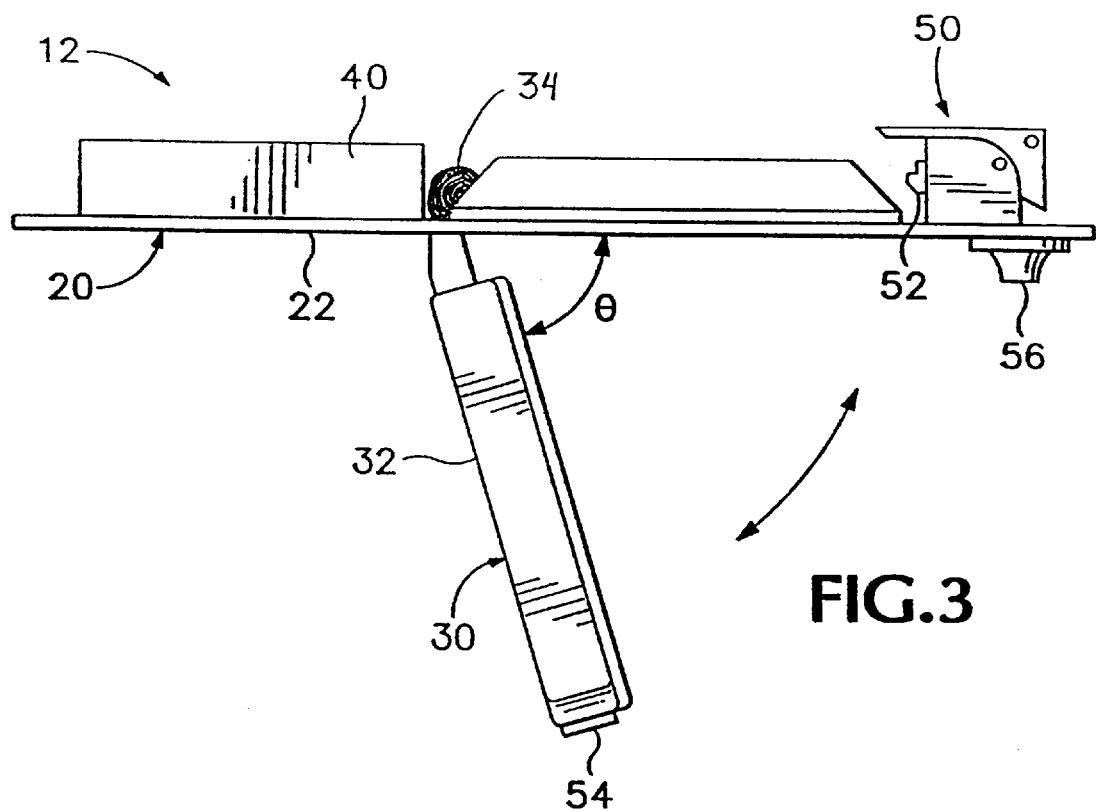
FIG. 3 is a side view of the display unit shown in FIGS. 1 and 2.

The display unit includes a generally planar mounting frame structure in the form of a housing 20, and a corresponding viewing screen 30, which is mounted on the housing for movement between a stowed position (FIG. 1) and a deployed position (FIG. 2). In the stowed position, the screen is contained within the housing, a viewing surface 32 thereof facing downwardly into the automobile passenger compartment toward a front seat passenger PF. In the deployed position, the screen projects downwardly from the housing (and thus downwardly from the ceiling) with the viewing surface facing rearwardly toward rear seat passenger PR as shown.

When in the stowed position, front seat passenger PF may comfortably watch the viewing surface by reclining in front seat 14*a*. Front seat 14*a*, it will be appreciated, includes an upright seat back which may be reclined as shown. FIG. 4 shows a reclined front seat passenger PF viewing the screen's viewing surface along a line of sight 16*a*. Rear seat passengers also may watch the viewing surface (albeit somewhat less comfortably) by looking up toward the screen's viewing surface from rear seat 14*b*. However, the driver will not be able to see the viewing surface from driver seat 14*c* due to positioning of the display unit.

Upon deployment of the screen, the screen is placed at an angle θ from horizontal, θ typically falling within a range of between approximately 30-degrees and 60-degrees. This presents the screen's viewing surface more directly to the rear seat passenger(s). However, the front seat passenger typically also may view the screen's viewing surface. As shown in FIG. 5, a reclined front seat passenger views the screen's viewing surface along a line of sight 16*a*. The back seat passenger views the screen's viewing surface along line of sight 16*b*. Again, the driver is unable to see the screen's viewing surface.

Referring now more particularly to the depicted display unit, housing 20 will be seen to have a proximal portion which is that portion closer to the rear of the automobile, and a distal portion which is that portion closer to the front of the automobile. The housing includes a perimeter structure 22 which in turn defines a cavity 24 configured to receive the screen when the screen is placed in its stowed position. Typically, the screen is pivotally received by the cavity, the screen being placed in the cavity with the viewing surface generally flush with perimeter structure 22, and thus with ceiling 10*a*. The cavity is of predetermined shape and size, typically conforming substantially to the shape and size of the viewing screen. It will be noted in FIGS. 1 and 2, for example, that cavity 24 is configured to accommodate near-fitted receipt of screen 30, with the screen fully contained within the cavity.

In the depicted embodiment, the housing is embedded in the ceiling in region 12*a*, the vehicle being provided with a ceiling recess positioned over the back support of the front passenger seat. The ceiling recess, it will be appreciated, is configured for receipt of the housing, or may itself act as a cavity for receipt of the viewing screen. In any event, the display unit is mounted over the head of the front passenger seat, and thus does not obstruct the view of rear view mirror 18. More particularly, it will be noted that the display unit is centered over an upright front passenger seat back.

Focusing now on the housing, it will be noted that the perimeter structure includes a generally planar flange 26 which may be secured to the ceiling via conventional fasteners such as screws. The flange is configured to conform to the contour of the ceiling, and preferably defines the lowermost surface of the housing. The housing thus may be flush-mounted with the ceiling. Furthermore, when the screen is in its stowed position with the screen contained within the cavity, the screen's viewing surface is generally flush with the flange, and correspondingly, is generally flush with the vehicle's ceiling.

The housing also may be fitted with a viewing surface cover 34 which is configured to cover the viewing surface when the display unit is not in use. In the depicted embodiment, the display unit cover is flexible, and thus may be stored on a roll mounted on housing 12. The depicted cover is deployed simply by gripping a leading edge of the cover through recess 34*a*, and pulling the cover along a track defined along the cavity opening.

In the depicted embodiment, screen 30 is separated from a video control module 40, which directs operation of the screen. The control module typically is mounted on the perimeter structure beside the screen and is connected to the screen via a ribbon wire or the like. Alternatively, the control module may be mounted in the vehicle dash, or elsewhere in the automobile, and connected to the viewing screen via cabling or the like. In either event, the display unit is relatively thin. In the depicted embodiment, for example, the display unit is less than 1½-inches thick and typically is approximately ½-inch to 1½-inches thick.

Turning now to viewing screen 30, it will be noted that the viewing screen is hinged to the housing adjacent the distal portion thereof to accommodate reversible swaying thereof in an upright plane which extends both through the housing and through the passenger seating area. The screen thus is deployed by pivot thereof about a first axis A which is substantially parallel to a first edge 30*a* of the screen. To deploy the screen, the screen is pivoted in a rearward direction to a deployed position where the screen is at an angle θ from horizontal. In the depicted embodiment, θ is within a range of between approximately 30-degrees and 60-degrees. This presents the screen's viewing surface to an upright rear seat passenger PR for viewing. However, as indicated in FIG. 5, the front seat passenger PF also may view the deployed screen.

The screen also may be retracted to its stowed position, again by pivot of the screen about axis A. When in the stowed position, the front seat passenger PF is able to comfortably watch the viewing surface by reclining his/her seat. The closer the screen is to horizontal, the more reclined the front passenger seat. Accordingly, it may be desirable to configure the housing so as to leave the viewing screen slightly inclined (perhaps 5-degrees), even when in the stowed position. Such an arrangement will accommodate viewing of the screen's viewing surface by the front seat passenger with minimal reclining of the front passenger seat.

The screen also is pivotal about a second axis B which is transverse to first axis A. Accordingly, the screen is adjustable by side-to-side rotation of the screen so as to selectively face the screen's viewing surface toward a selected rear seat passenger. The screen's viewing surface thus may selectively be placed in either rear seat passenger's line of sight.

The display unit also employs a locking mechanism which selectively maintains the screen in its stowed position. The locking mechanism includes a catch 52 mounted on the housing and configured to selectively engage a corresponding recess or detent 54 in the screen's second edge 30*b*. The locking mechanism is operable via a lever 56 which extends (and retracts) the catch for capture (and release) by recess.

An overhead display system thus is provided when the display system includes a front passenger seat with a reclinable seat back, an automobile ceiling with a recess formed therein over the seat back of the front passenger seat, and a viewing screen operatively mounted on the ceiling for receipt within the recess. As indicated, the viewing screen includes a viewing surface which selectively faces downwardly toward the front passenger seat such that the viewing surface is viewable by a front seat passenger seated in the front passenger seat with the seat back reclined. The viewing screen also may be pivoted to extend downwardly from the ceiling and faces rearwardly for viewing by both a reclined front seat passenger and a rear seat passenger.

While the present invention has been shown and described with reference to the foregoing operational principles and preferred embodiment, it will be apparent to those skilled in the art that other changes in form and detail may be made therein without departing from the spirit and scope of the invention as defined in the appended claims.

I claim:

1. In an automobile having a ceiling and front and rear passenger seats an overhead display unit comprising:

a ceiling mount mounted above the front passenger seat of the automobile, the ceiling mount defining a housing with a cavity having a shape and size;' and a screen with a viewing surface, the screen being mounted on the ceiling mount for pivotal movement between a stowed position wherein the screen fits within the cavity and the viewing surface faces downwardly from the ceiling for viewing by a reclined front seat passenger with the viewing surface defining a plane generally parallel to the ceiling, and a deployed position wherein the viewing surface faces rearwardly for viewing by a rear seat passenger; and wherein the housing includes a surface cover configured to selectively cover the viewing surface of the screen when the screen is in the stowed position.

2. The display unit of claim 1, wherein the display unit further comprises a video control module mounted separately from the screen and supported by the ceiling mount, the control module being operatively connected to the screen to direct operation of the screen.

3. The display unit of claim 2, wherein the control module is mounted on the housing in a laterally spaced relationship to the screen.

4. An overhead automotive display system comprising:

a front passenger seat with a reclinable seat back;

an automobile ceiling with a recess formed therein, the recess being located over the seat back of the front passenger seat; and a viewing screen operatively mounted on the ceiling for receipt within the recess, the viewing screen having a viewing surface which faces downwardly toward the front passenger seat such that the viewing surface is viewable by a front seat passenger seated in the front passenger seat with the seat back reclined; wherein the screen is operatively pivotally mounted to the ceiling, the screen being pivotal about a first axis between a stowed position wherein the viewing surface faces downwardly from the ceiling for viewing by a reclined front seat passenger, and a deployed position wherein the viewing surface faces rearwardly for viewing by both a reclined front seat passenger and a rear seat passenger; and wherein the housing includes a flexible viewing surface cover configured for selected deployment from a rolled orientation to an extended orientation wherein the viewing surface cover covers the viewing surface of the screen.

5. In an automobile having a generally planar ceiling, a front passenger seat with a reclinable seat back and a back passenger seat, a ceiling-mounted display unit comprising:

a generally planar mounting frame structure joined with the ceiling in a location centered over the front passenger seat, the mounting frame structure being joined generally co-planarly with the ceiling;

and a generally planar screen structure having a thickness of less than 1.5 inches, the screen structure including a viewing surface, and being pivotally mounted on the mounting frame structure for reversibly swaying about a first axis between a stowed position wherein the screen structure lies in a plane generally paralleling the plane of the mounting frame structure such that the viewing surface is viewable by a passenger seated in the front passenger seat with the seat back reclined, and a deployed position wherein the screen structure occupies a more upright plane which lies at an angle relative to the plane of the mounting frame structure such that the viewing surface is viewable by a passenger scated in the rear passenger seat; and wherein the mounting frame structure defines a housing with a cavity having a shape and size, and wherein the screen is sized to fit within the cavity when the screen is in the stowed position; and wherein the housing includes a viewing surface cover configured for selected extension over the cavity to cover the viewing surface of the screen.

* * * * *